United States Patent [19]

Kojima et al.

[11] Patent Number: 4,874,174
[45] Date of Patent: Oct. 17, 1989

[54] TUBE CONNECTING UNIT

[75] Inventors: Fumio Kojima; Yoshikazu Tachiiri; Yoshihisa Kato, all of Toyota, Japan

[73] Assignees: Aisin Seiki Kabushiki Kaisha; Toyota Jidosha Kabushiki Kaisha, both of Aichi, Japan

[21] Appl. No.: 165,057

[22] Filed: Mar. 7, 1988

[30] Foreign Application Priority Data

Mar. 5, 1987 [JP] Japan .................................. 62-32304
Aug. 31, 1987 [JP] Japan ................................. 62-217600

[51] Int. Cl.4 ............................................ F16L 21/06
[52] U.S. Cl. ...................................... 285/82; 285/305; 285/347
[58] Field of Search .................. 285/305, 81, 82, 230, 285/347, 356, 321

[56] References Cited

U.S. PATENT DOCUMENTS

| 975,138 | 11/1910 | Lancaster | 285/81 |
| 3,177,019 | 4/1965 | Osweiler | 285/288 |
| 3,314,696 | 4/1967 | Ferguson et al. | 285/305 X |
| 3,776,576 | 12/1973 | Keyser | 285/288 X |
| 4,009,896 | 3/1977 | Brewer | 285/305 |
| 4,226,445 | 10/1980 | Kramer | 285/321 X |
| 4,526,411 | 7/1985 | Bartholomew | 285/305 |
| 4,537,427 | 8/1985 | Cooke | 285/305 |
| 4,635,974 | 1/1987 | Moussaian | 285/305 |
| 4,725,081 | 2/1988 | Bauer | 285/305 |

FOREIGN PATENT DOCUMENTS

| 277780 | 5/1963 | Australia | 285/81 |
| 2028712 | 12/1971 | Fed. Rep. of Germany | 285/321 |
| 2266091 | 10/1975 | France | 285/305 |
| 332173 | 7/1936 | Italy | 285/305 |

Primary Examiner—Thomas F. Callaghan
Attorney, Agent, or Firm—Sughrue, Mion, Zinn, Macpeak & Seas

[57] ABSTRACT

A tube connecting unit for connecting a tube to an apparatus, comprising a cylindrical adapter having a pair of slits formed on the periphery, a cylindrical connector inserted in a inner bore of the adapter and having an annular groove formed on the periphery so as to accord to the slits of the adapter, a tube inserted in the inner bore of the connector and having a flange portion for preventing the tube from slipping out of the connection, and a clip-like spring fitted in the slits of the adapter and the annular groove of the connector for preventing the connector from slipping out of the adapter.

2 Claims, 3 Drawing Sheets

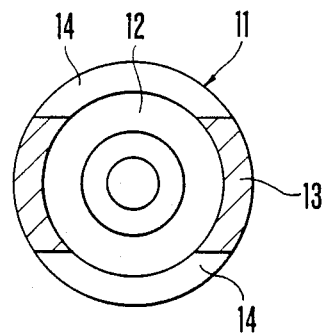
FIG.5
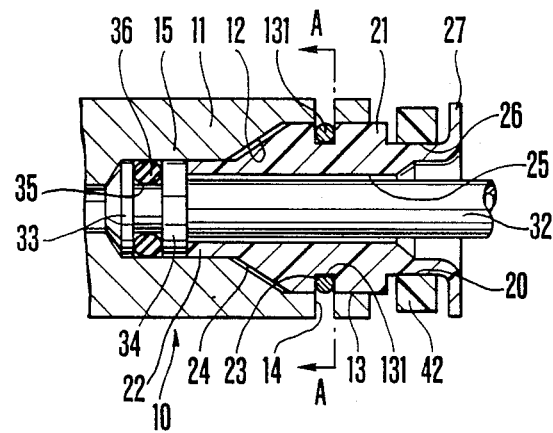
FIG.6
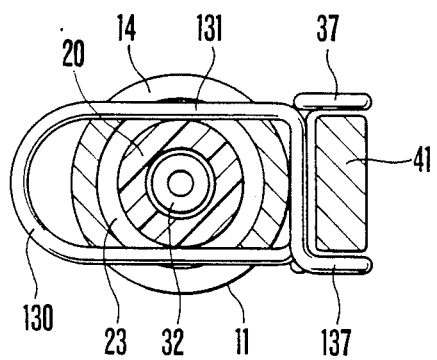

TUBE CONNECTING UNIT

BACKGROUND OF THE INVENTION

1. Field of the Invention

This invention relates to a tube connecting unit for joining a tube to, for example, a device that feeds air to a pneumatically operated machine. The fluid fed through the tube is not limited to air but may be other types of gases or liquids.

2. Description of the Prior Art

A conventional device of tube connector is, for example, disclosed in the Japanese Utility Model Laid-open Publication No. 120485 of 1981 (Jitsu-kai-sho 56-120485).

In the above conventional tube connector, a tube has a fastening part formed by expanding one end thereof. An O-ring is fitted over the tube. The tube is fitted in a small bore of a cap nut which is screwed onto the connector. Thus, the tube is fastened to the connector while the fastening part and O-ring are hermetically held between the inner wall of the cap nut and the inner wall of the connector.

In the conventional fastening method just described, a tube is fitted by screwing together a connector and a cap nut. The cap nut must then be tightened with a tool by exerting a predetermined torque. This tightening operation has been inefficient. The inefficiency increases when the connector is fastened to a machine or the like installed in a limited space.

BRIEF SUMMARY OF THE INVENTION

The object of this invention is to provide a tube connecting unit to improve the efficiency of tube connecting work, and, more particularly, to prevent a drop in efficiency in such small space where the use of tool may be considerably limited.

In accordance with the invention, a tube is connected to an adapter through a connector. The tube has an engaging part provided near the end thereof to prevent a slip off from the connector. The connector has a bore to pass in said tube and an end surface adapted to come in contact with the engaging part of the tube. The contact established between the engaging part and the end surface prevents the tube from slipping off. An annular groove is cut in the periphery of the connector.

The adapter is, or can be, fastened to, for example, a pneumatically operated device. The adapter has a bore to contain said connector. The adapter also has a pair of opposite slits which are deep enough to reach the bore and cut in such positions that the slits meet said annular groove on the connector when the connector is fitted in the adapter.

An elastic member having a pair of arms constantly urged in the closing direction is fitted in said pair of slits in the adapter. When the connector is inserted into the adapter until the groove thereon meets the slits in the adapter, the arms of the elastic member fit in the groove on the connector. The engaging part thus held in contact with the end surface of the connector prevents the tube from slipping off. The arms fit in the groove hold the connector inserted into the adapter at the point where the groove meets the slits in the adapter.

Thus, one embodiment of the tube connector according to this invention comprises, a cylindrical adapter having a stepped bore on the inside and a pair of opposite slits cut in the periphery to open into said stepped bore, a cylindrical connector having a larger-diameter part, a smaller-diameter part, an intermediate tapered part, an inner bore and an annular groove cut in the periphery of said larger-diameter part and being adapted to fit in the stepped bore in said adapter, a tube adapted to be fitted in the inner bore of said connector, having a large-diameter bead at one end thereof and an flange provided away from the large-diameter bead so as to be stopped by the smaller-diameter part of said connector, an O-ring fitted between the large-diameter bead and the flange of said tube to fit tight to the small diameter bore of the adapter, and a clip spring fitted resiliently but axially unmovably in the slits cut in said adapter and having a pair of arms performing a cam action in conjunction with the tapered part of said connector to fall into said annular groove cut therein.

The adapter and connector can be fastened together very easily by fitting the tube and connector together into the bore of the adapter, with the required fluid tightness assured by means of the O-ring. The paired arms of the clip spring resiliently fitted in the slits in the adapter work like a cam over the tapered surface of the connector. While getting expanded by the tapered surface, the paired arms resiliently fit into the annular groove in the connector when the annular groove matches the slits. Therefore, the connector and adapter can be easily fitted together by simply inserting the connector and tube together into the bore of the adapter.

The connecting units of this invention permit accomplishing tube connection without using a tool and also assure that proper connection is maintained constantly without requiring any additional trouble such as the readjustment of tightening torque. This improves the efficiency of the connecting operation. The improvement is particularly remarkable where the working space is limited. Connection can be achieved even in such a very small space where there has been no way to connect tubes with conventionally known means.

The foregoing and other objects, features and advantages of the present invention will be understood more clearly and fully from the following detailed description of preferred embodiments with reference to the attached drawings.

BRIEF DESCRIPTION OF THE DRAWINGS

FIG. 4 shows a sectional view taken along B—B line in FIG. 3.

FIG. 5 shows a cross-sectional side view of a second embodiment of the tube connecting unit according to the invention.

FIG. 6 shows a sectional view taken along A—A line in FIG. 5.

DETAILED DESCRIPTION OF THE PREFERRED EMBODIMENTS

Now preferred embodiments of a tube-connecting unit according to this invention will be described by reference to the accompanying drawings.

Figure 1:
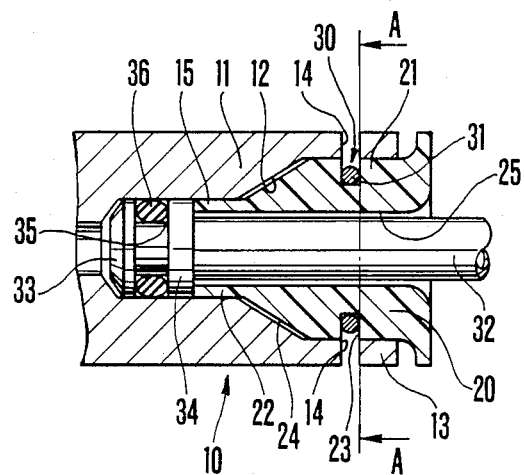
FIG. 1 shows a cross-sectional side view of a first embodiment of the tube connecting unit according to the invention.
Figure 2:
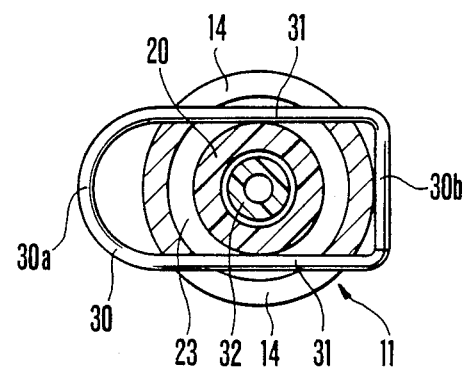
FIG. 2 shows a sectional view taken along A—A line in FIG. 1.
Figure 3:
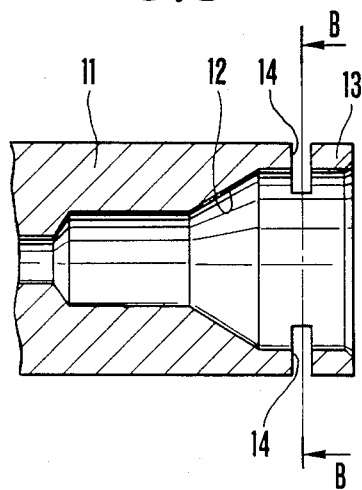
FIG. 3 shows a cross-sectional side view of an adapter used in the embodiment of FIG. 1.

FIG. 1 shows a tube connecting unit 10 for fastening an air tube for the air-suspension systems of vehicles. The tube connecting unit 10 comprises an adapter 11 to be fastened to a hydraulically operated device, a connector 20 to establish a fluid-tight connection between the adapter 11 and a tube 32, and a clip spring 30. The adapter 11 made of metal is cylindrical as shown in FIGS. 1 to 4, with a stepped bore 12 provided on the inside. A pair of opposite slits 14 are cut in the larger-diameter part 13 thereof to open into said stepped bore 12. The connector 20 of plastic materials is fitted in the stepped bore 12 of the adapter 11. The connector 20 has a stepped cylindrical shape. In the periphery of the larger-diameter part 21 thereof is cut an annular groove 23 which is adapted to match the slits 14 on the adapter 11 when the connector is fitted in the adapter. A tapered surface 24 is provided between the larger-diameter part 21 and a smaller-diameter part 22.

A tube 32 of nylon is inserted in the bore 25 of the connector 20. The tube 32 has at the tip thereof a large-diameter bead 33 that is guided into a smaller-diameter bore 15 in the tapered bore 12 of the adapter 11. The tube 32 also has a flange 34 that is provided a given distance away from the large-diameter bead 33. While the periphery of the flange 34 is guided along the smaller-diameter bore 15 of the adapter 11, the end surface thereof comes in contact with the end surface of the smaller-diameter part 22 of the connector 20 to prevent slip-off. The large-diameter bead 33 may be either integrally formed with the tube 32 or provided by attaching a flanged sleeve to an open end of the tube 32. The large-diameter bead 33 and flange 34 leaves an annular groove 35 therebetween. An O-ring 36 is fitted in the groove 35 so that the periphery thereof is hermetically pressed against the wall of the smaller-diameter bore 15 in the adapter 11.

A clip spring 30 having a pair of arms 31, an arched portion 30a and a rod portion 30b is resiliently but axially unmovably fitted in the slits 14 on the adapter 11. Projecting into the tapered bore 12 of the adapter 11, the paired arms 31 fit in the annular groove 23 on the connector 20.

The connector 20 is inserted into the stepped bore 12 in the adapter 11, with the paired arms 31 of the clip spring 30 resiliently fitted in the slits 14 on the adapter 11 and the flange 34 of the tube 32, which has the O-ring 36 fitted in the groove 35 thereon, stopped by the smaller-diameter part 22. Then, the arms 31 of the clip spring 30 projecting into the stepped bore 12 of the adapter 11 come in contact with the tapered surface 24 of the connector 20. The paired arms 31 and the tapered surface 24 then work together like a known cam mechanism. As the connector 20 is inserted deeper, the cam action expands the paired arms 31 in the slits 14 until the slits 14 match the annular groove 23 on the connector 20 when the arms 31 resiliently contract to fit in the annular groove 23. The arms 31 of the clip spring 30 surely keep the adapter 11 and connector 20 in the joined position, without allowing axial movement thereof relative with each other. And according to this embodiment, since the slip-off of the tube 32 is prevented by contact between the flange 34 and the smaller-diameter part 22 of the connector, even though the tube 32 is pulled, the filling up rate of the O-ring 36 is unchangeability. As a result, it is able to surely maintain the airtightness of the tube connecting unit.

FIG. 5 shows a cross-sectional view along the center line of a second preferred embodiment of this invention in the connected condition. FIG. 6 is a cross-section taken along the line A—A of FIG. 1.

A substantially flange-like large-diameter bead 33 is formed at the tip of a tube 32. A similar large-diameter flange 34 is also provided a given distance away from the bead 33. An O-ring 36 is fitted in a groove 35 left between the large-diameter bead 33 and flange 34.

The tube 32 is inserted in a bore 25 in a connector 20 which has a substantially cylindrical shape. The connector has a smaller-diameter part 22, a tapered surface 24, a larger-diameter part 21, a medium-diameter part 26 and a flange 27. The larger-diameter part 21 has an annular groove 23 cut around the periphery thereof.

An adapter 11 has a smaller-diameter bore 15 communicating with the fluid passage, a substantially tapered bore 12 and a larger-diameter bore 13. A pair of slits 14 deep enough to reach the larger-diameter bore 13 are cut on the opposite sides thereof. The slits 14 are positioned so that the slits 14 must meet the groove 23 on the connector 20 when the connector is inserted in the adapter 11, the tip of the tube is inserted in the smaller-diameter bore 15 in the adapter 11, and the O-ring 26 seals together the adapter 11 and the tube 32.

Figure 9:
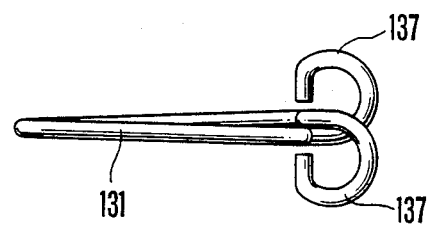
FIG. 9 shows a side view of a clip-spring used in the embodiment of FIG. 5.

Before the connector 20 is inserted, a clip spring 130 is fitted in the slits 14 in the adapter 11. The clip spring 130 is shaped as illustrated in FIGS. 6 and 9. The clip spring 130 has a pair of arms 131 which are curved into a substantially U-shaped form. Each arm has a curled part 137 at the tip thereof. Sharply bent near the curled part, the arms 131 cross each other like a letter X. When the curled parts 137 are brought closer, the space between the arms 131 widens. The clip spring 130 is made of elastic material and designed to get stabilized in the state as shown in FIG. 6. When the space between the arms 131 becomes wider than that shown in FIG. 6, an elastic force bring the arms back to the original condition shown in FIG. 6 occurs.

When the connector 20 is inserted in the adapter 11 while the clip spring 130 is fitted in the slits 14 in the adapter 11, the arms 131 of the clip spring 130 are expanded by the tapered surface 24 of the connector 20. When the connector 20 is further pressed in until the annular groove 23 meets the slits 14, the arms 131 elastically fit in the annular groove 23. In this condition, the connector 20 is firmly connected to the adapter 11 because axial movement thereof is no longer allowed.

Figure 7:
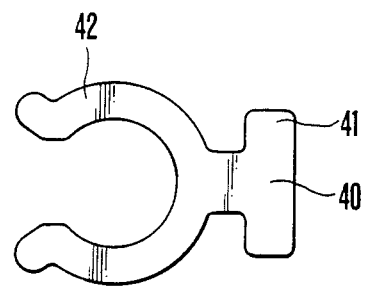
FIG. 7 and FIG. 8 show a plan view and a side view of a stopper used in the embodiment of FIG. 5 respectively.
Figure 8:
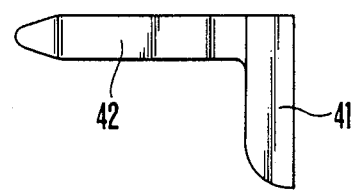

In this preferred embodiment, a stopper 40 is used to ensure that the clip spring 130 functions properly. The stopper 40, which is shaped as shown in FIGS. 7 and 8, consists of an elastically deformable partially cut opened circular part 42 and a flat part 41 extending substantially perpendicularly therefrom. The flat part 41 has a width which is substantially equal to the space between the curled parts 137 of the slip spring 130 in the condition shown in FIG. 6. The flat part 41 fits in between the curled parts 137 when the near-circular part 42 is fitted over the medium-diameter part of the connector 20. When the flat part 41 thus fits in between the curled parts 137, the curled parts 137 are no longer allowed to get closer and, as a consequence, the arms 131 are no longer allowed to spread out. Thus, the stopper 40 assures the firm coupling of the connecting unit 10.

Figure 10:
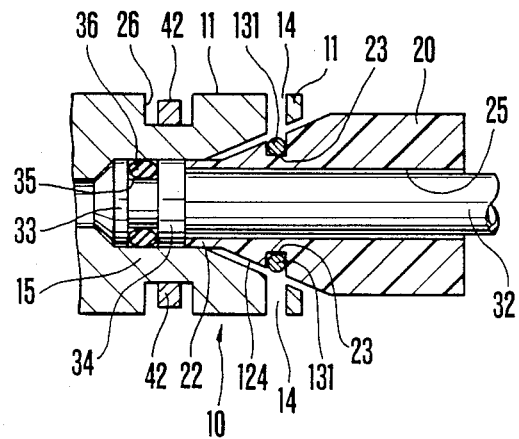
FIG. 10 shows a cross-sectional side view of a third embodiment of the tube connecting unit according to the invention.

FIG. 10 is a cross-sectional view of a third preferred embodiment similar to FIG. 5. In this preferred embodiment, the annular groove 23 of the connector 20 is provided on the tapered surface 124. The annular groove 23 of the third preferred embodiment thus provided on the tapered surface 124 provides the same function and effect as the annular groove 23 of the first preferred embodiment that is on the larger-diameter part 21 of the connector.

In the third preferred embodiment, the stopper 40 is fastened to the adapter 11. More specifically, the near-circular part 42 of the stopper 40 is fastened to an annular groove 26 cut in the periphery of the adapter 11. Despite this difference in the fastening method, the stopper 40 provides the same function and effect as in the second preferred embodiment.

It should be understood that, although the preferred embodiment of the present invention has been described herein in considerable detail, certain modifications, changes, and adaptions may be made by those skilled in the art and that it is hereby intended to cover all modifications, changes and adaptions thereof falling within the scope of the appended claims.

What is claimed is:

1. A tube connecting unit comprising:
a cylindrical adapter having a stepped inner bore and a pair of opposite slits formed in the periphery thereof and extending into communication with said inner bore;
a cylindrical connector fitted in the stepped inner bore of said cylindrical adapter and having an inner bore for receiving a tube and an annular groove formed on the periphery thereof in alignment with said slits of the adapter;
a tube inserted into the inner bore of said connector, one end portion of said tube being provided with a bead, a flange and an annular groove between said bead and said flange for receiving a sealing member, said bead and said flange being disposed in guiding engagement with said inner bore of said adapter with said flange engaging one end of said connector to prevent the tube from slipping out of the connector;
a sealing member disposed in said groove in engagement with aid inner bore of said adapter; and
a spring member comprising a clip spring and a stopper for resiliently engaging said connector to said adapter and preventing the connector from slipping out of the adapter, said clip spring having a pair of arms fitted in said slits of the adapter and in said annular groove of the connector, an arched portion connecting the ends of said arms and a pair of extending portions formed on the other ends of each of said arms, said stopper comprising a first portion adapted to be inserted in between the extending portions for maintaining the spring force of the clip spring and a second portion engaging with either the peripheral surface of said connector or said adapter for maintaining stability of said first portion.

2. A tube connecting unit comprising:
a cylindrical adapter having a stepped inner bore and a pair of opposite slits formed in the periphery thereof and extending into communication with said inner bore;
a cylindrical connector fitted in the stepped inner bore of said cylindrical adapter and having an inner bore for receiving a tube and an annular groove formed on the periphery thereof in alignment with said slits of the adapter;
a tube inserted into the inner bore of said connector, one end portion of said tube being provided with a flange, said flange being disposed in guiding engagement with said inner bore of said adapter and engaging one end of said connector to prevent the tube from slipping out of the connector; and
a spring member comprising a clip spring and a stopper for resiliently engaging said connector to said adapter and preventing the connector from slipping out of the adapter, said clip spring having a pair of arms fitted in said slits of the adapter and in said annular groove of the connector, an arched portion connecting the ends of said arms and a pair of extending portions formed on the other ends of each of said arms, said stopper comprising a first portion adapted to be inserted in between the extending portions for maintaining the spring force of the clip spring and a second portion engaging with either the peripheral surface of said connector or said adapter for maintaining stability of said first portion.

* * * * *